Dec. 5, 1933.   L. L. STEINDLER ET AL   1,938,502
DOOR OPERATING AND CONTROLLING MECHANISM
Filed July 13, 1929   2 Sheets-Sheet 1
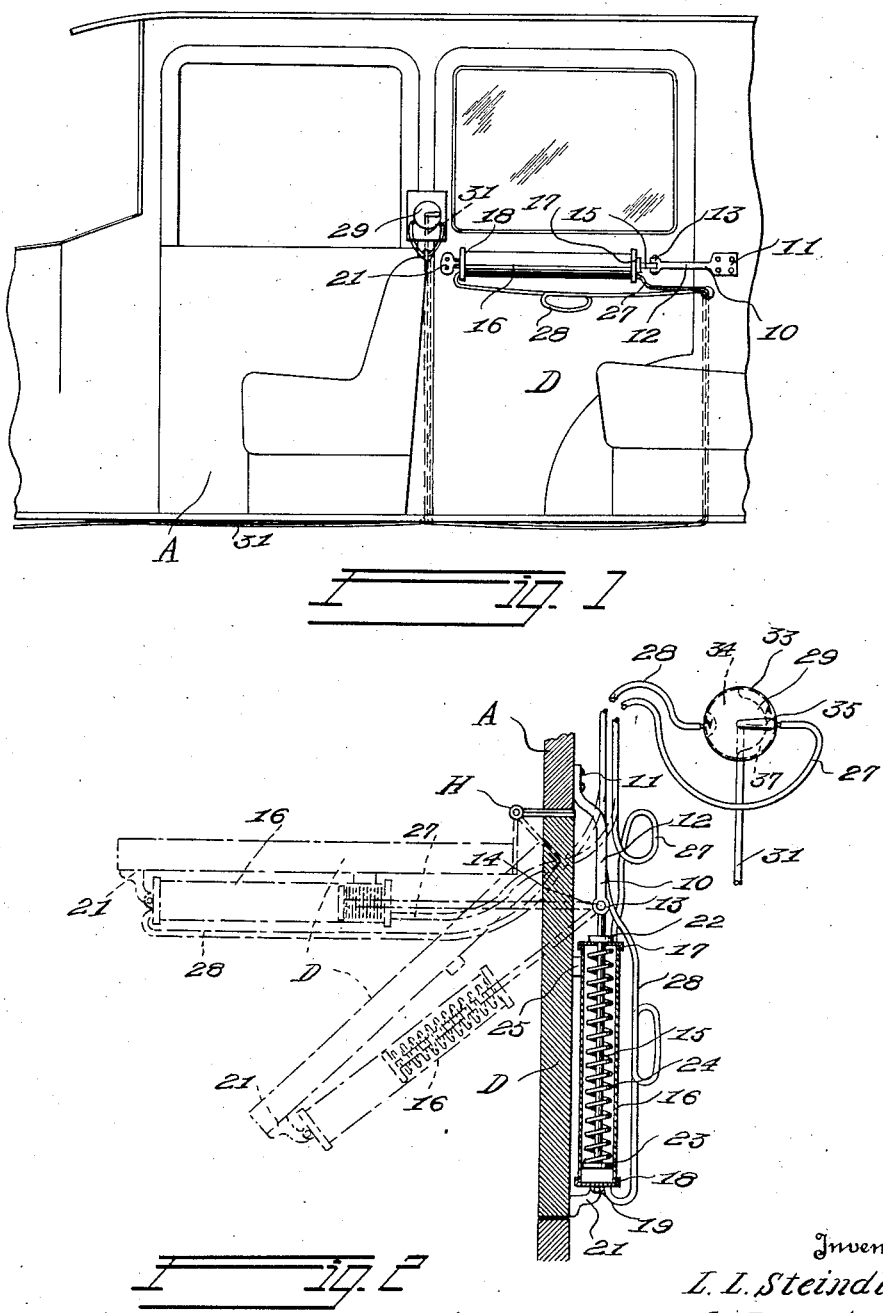

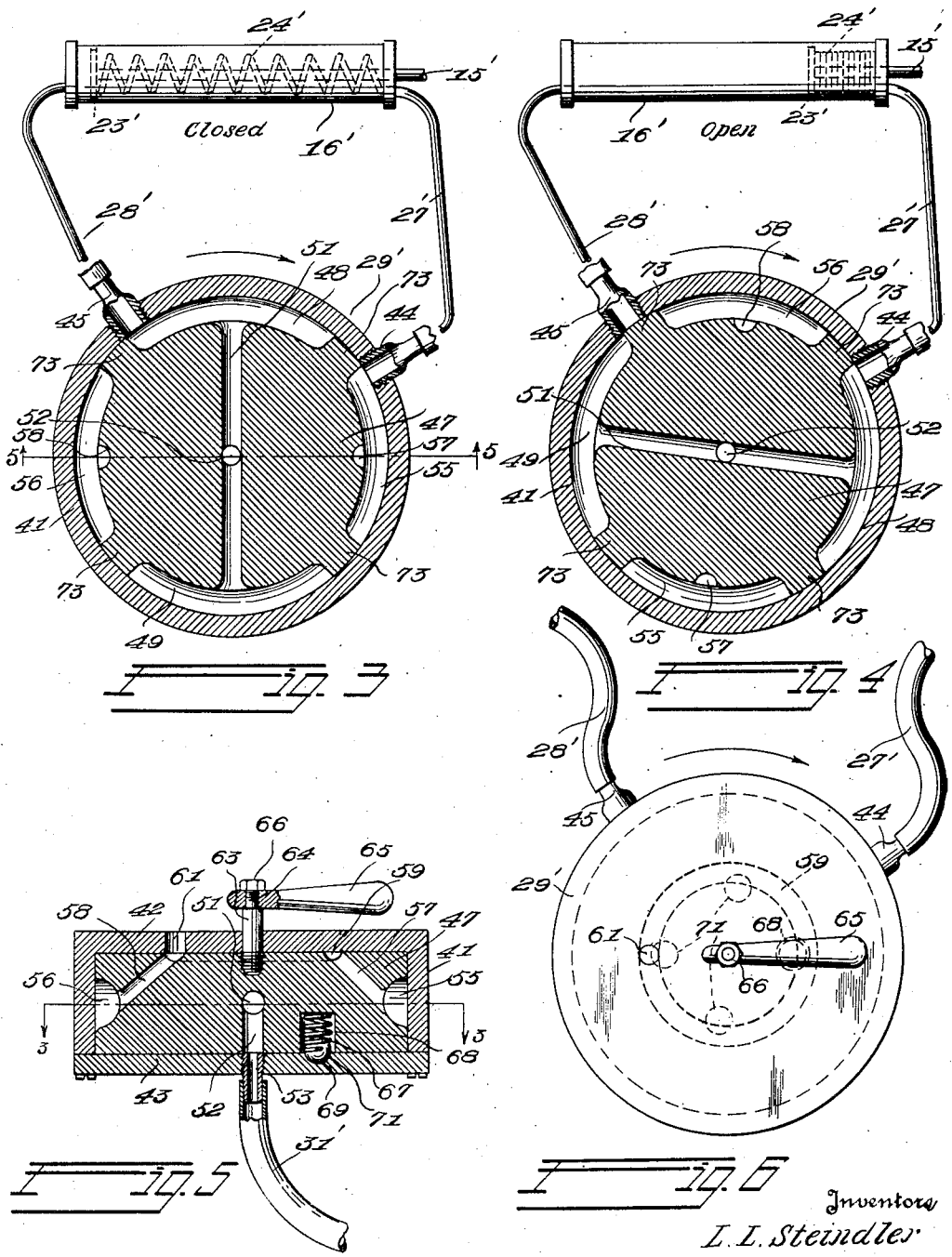

Patented Dec. 5, 1933

1,938,502

UNITED STATES PATENT OFFICE 1,938,502

DOOR OPERATING AND CONTROLLING MECHANISM

Leslie L. Steindler, Mamaroneck, N. Y., and Charles B. Waters, Montclair, N. J.; Julia K. Waters, administratrix of said Charles B. Waters, deceased Application July 13, 1929. Serial No. 378,012

6 Claims. (Cl. 296—44)

The present invention relates to internal combustion motor vehicle door control means utilizing the motor to operate the door.

More specifically, the invention relates to mechanism for association with a door for controlling the opening and closing thereof, the mechanism comprising means within the ready control of an operator whereby the door is inherently capable of being opened and closed only at the discretion of the operator.

The invention, while applicable to doors in general, is particularly adapted for use on motor driven taxicabs or busses, the rear door or doors of which control the admittance and discharge of passengers and in view of the fact that passengers are required to pay the operator for the transportation and further in view of the fact that taxicab companies are responsible for the safety of passengers it is highly important, both in the interest of taxicab operators and passengers conveyed thereby, that the doors be so controlled that they cannot be unintentionally or inadvertently opened except at the discretion of the operator of the taxicab.

Taxicabs as now operated have the rear doors thereof provided with catches of common construction whereby the door can be readily opened either from within or without the cab, as a result of which a passenger may open the door when the cab is travelling at a high rate of speed thus seriously endangering his safety for which the taxicab company is responsible, or a door may be opened by a passenger just before the cab comes to a stop as the operator thereof is pulling in close to some obstacle as a parked vehicle resulting in the door being damaged with possible injury to the passenger.

Furthermore by providing the doors with the usual catches only, an unscrupulous passenger may open the door as the cab comes to a stop and leave the cab without paying his transportation fee.

Furthermore, with the use of the ordinary catches for maintaining a door closed there is a possibility in closing the door of the catch not being in full set position resulting in the door swinging open after the vehicle has attained considerable speed which may damage the door or result in injury to a passenger, or a passenger may be thrown from the vehicle. Furthermore the usual catch, even if properly set may become unfastened resulting in the door swinging open.

It is accordingly a primary object of the invention to provide automatic door control means whereby a door may be controlled in its swinging movements at a remote point.

It is a further object of the invention to provide door control means for automotive vehicles whereby a door of the vehicle can be opened only at the discretion of an operator through manipulation of said means if desired.

It is a still further object of the invention to provide door control mechanism for automotive vehicles embodying means for holding a door closed, and additional means operative by the power plant of the vehicle for assisting and retarding said first means.

It is a still further object of the invention to provide door control mechanism for automotive vehicles adapted for detachable connection with a door of a vehicle and including motor means operative by the vehicle power plant for controlling the door in its swinging movements.

It is a still further object of the invention to provide automatic door control mechanism adapted for detachable association with a door of a vehicle and embodying valve controlled fluid motor means adapted for connection with the vehicle power plant for controlling the swinging movement of the door through said valve during operation of said power plant.

A still further object of the invention is to provide automatic door control mechanism especially adapted to doors of taxicabs and which is relatively simple in construction, comparatively cheap of manufacture, easy to assemble and which is well adapted to the use for which it is intended.

With the above objects in view as well as others that will become apparent during the course of the following disclosure, reference will be had to the accompanying drawings part of same and in which:

Figure 1 is a fragmental side elevational view of the interior of a vehicle showing one of the applications of our invention, the view being diagrammatic in nature.

Figure 2 is a fragmental horizontal sectional view disclosing the application of our invention to a door, the door being shown in open position, as well as in partially open position by dot and dash lines for more clearly indicating the action of the mechanism constituting our invention.

Figures 3 and 4 are broken views on different scales disclosing more or less diagrammatically the operating member together with a valve suitable for controlling said operating member, the valve being shown in horizontal section as represented by line 3—3 in Figure 5, the valve represented in Figure 3 being indicated in its position when the door is closed, and the valve represented in Figure 4 being indicated in its position when the door is open.

Figure 5 is a vertical sectional view of the valve as seen on line 5—5 of Figure 3.

Figure 6 is a top plan view of the valve represented in Figures 3, 4 and 5.

Referring to the drawings by reference characters in which like characters designate like parts, and referring first to Figures 1 and 2. The letter A represents a portion of a motor vehicle such as a taxicab provided with a rear door D for controlling admission to and exit from the rear compartment in taxis as adapted for the conveyance of passengers.

The device of the present invention is adapted for connection with the door D and while it is preferable to control only the right hand or curb side door of the vehicle, as illustrated, in which instance the other door may be locked, both rear doors of the vehicle may be provided with the control mechanism forming the subject matter of the present application.

The door D is hingedly connected with the body of the vehicle A by the hinge H in the usual manner, as represented in Figure 2, and the door of the free edge thereof is provided with the usual fastener (not illustrated).

The mechanism constituting the present invention comprises a bracket 10 secured at one end thereof to the inside of the body of vehicle A immediately outward of the hinge connection of door D is as represented at 11, the bracket 10 comprising an elongated body portion 12 projecting beyond the door hinge H in parallel spaced relation to door D and provided on the free end thereof with spaced transversely apertured ears 13. Pivotally secured between ears 13 by means of a pintle 14 is the outer end of a piston rod 15 which rod is longitudinally movably mounted within a cylinder 16. Cylinder 16 is provided with closed ends, which may embody detachable caps 17 and 18, or if desired, the end of cylinder 16 closed by cap 18 may be integral with the cylinder. Cylinder 16 at the end thereof closed by cap 18 is pivotally secured at 19 to a suitable bracket 21 secured to the inside of door D adjacent the free or latched edge thereof. Cap 17 is preferably provided with a stuffing box 22 through which as well as cap 17 the piston rod 15 extends for longitudinal movement within cylinder 16, the stuffing box 22 providing a fluid seal around rod 15. The opposite end of rod 15 is provided with a piston 23 in fluid tight engagement with the inner cylindrical wall of cylinder 16. A helical spring 24 is positioned within cylinder 16 in surrounding relation to rod 15 with the opposite ends thereof respectively in bearing engagement with piston 23 and the opposite end of cylinder 16, as clearly indicated in Figure 2.

The spring 24 is of a construction to exert considerable endwise pressure and the spring normally maintains the piston 23 at its maximum limit of movement in cylinder 16 toward the end 18 when the door is in closed position as represented in full lines in Figure 2.

Thus it will be seen that the spring 24, through the connections with which it engages, yieldably holds door D in closed position and in order to open door D sufficient pressure must be exerted thereagainst to overcome the expansive effort of the spring 24 which can be made of any desired strength in order to provide sufficient yielding resistance to the opening of the door.

Upon reference to Figure 2, it will be seen that in both the closed and open positions of door D, cylinder 16 is parallel with door D with the end thereof adjacent cap 17, resting against a stop 25 suitably secured to the inside of door D and which may be of a yieldable nature, and that as door D is being opened or closed cylinder 16 swings on its pivot 19 out of engagement with stop 25 between the closed and open positions of the door. It will further be seen upon reference to Figure 2 that as door D is opened, spring 24 is gradually compressed until the door is completely opened as represented in dot and dash lines when spring 24 is at its limit of compression with an expansive tendency to close the door.

With the construction so far described the door with which it is associated will be yieldably held in closed position but the invention further includes means for assisting and retarding the action of spring 24 in order that an operator of a vehicle and particularly a taxi may have control of the mechanism in order to assist and retard or oppose the action of spring 24 in order that the door may be manually opened, maintained in open position, and closed.

Such means comprises valve controlled conduits communicating with opposite ends of cylinder 16 for alternately putting cylinder 16 on opposite sides of piston 23 into communication with vacuum or suction and atmosphere respectively for supplementing the action of spring 24 for closing the door and maintaining the door closed and for opposing the action of spring 24 for closing the door and maintaining the door closed and for opposing the action of spring 24 for conditioning the door for manual opening thereof.

The means referred to preferably comprise a tube or conduit 27 communicating at one end thereof with one end of cylinder 16 and a second tube 28 communicating at one end thereof with the opposite end of cylinder 16, the opposite ends of tubes 27 and 28 communicating with a control valve 29 with which valve one end of a tube 31 communicates having the opposite end thereof connected with the engine intake manifold or vacuum tank, the construction defined forming a suction or servo motor. Valve 29 is positioned for easy access by the taxi operator, as by being fixed to the taxi-meter as indicated in Figure 1 or in any other accessible position. The valve 29 may be of any desired construction such that by manipulation thereof tubes 27 and 28 may be placed alternately in communication with atmosphere and vacuum for efficient control of door D in the manner hereinafter described.

As illustrated more or less diagrammatically in Figure 2, valve 29 may comprise an outer casing 33 in which is mounted a valve shift member 34 rotatable within casing 33 through manual manipulation of handle 35.

The member 34 is so ported that by rotation thereof to one position tube 27 is in communication with atmosphere and tube 28 in communication with suction or vacuum which is the position of parts when the door is closed as illustrated in Figure 2 and in which it will be seen that the expansive effort of spring 24 will be supplemented by placing cylinder 16 in communication with atmosphere on the spring pressed side of piston 23 and in communication with vacuum on the opposite side of piston 23. Thus by the combined pressure of spring 24 and opposed atmosphere and vacuum on piston 23 the door D will be held in closed position under substantial pressure whereby even if the door catch is released the resistance of the door against being opened will be sufficient that it could not ordinarily be opened by exertion of pressure thereto by a passenger within the taxi.

When it is desired to have door D opened, the operator will rotate member 34 through handle 35 to a position such that tube 27 is placed in communication with vacuum and tube 28 placed in communication with atmosphere whereby the combined action of atmosphere and vacuum on opposite sides of piston 23 will oppose the expansive force of spring 24 thus substantially reducing the closing pressure on door D whereby the door can be pushed open without substantial effort on the part of a passenger or the operator. When the door is completely opened as indicated by dot and dash lines in Figure 2 the valve 29 is preferably so constructed, such e. g. as the valve illustrated in Figures 3 to 6 hereinafter described that tube 28 which at this time is in communication with atmosphere is closed thus providing compression in the outer end of cylinder 16 which is assisted by vacuum on the opposite sides of piston 23 for holding the door open for the discharge or admittance of passengers from or to the vehicle. When it is desired to close the door, valve 29 is again manipulated for reversing atmosphere and vacuum in accordance with the first position of valve 29 when atmosphere is placed on the spring pressed side of piston 23 and vacuum on the opposite side thereof for assisting spring 24 in closing the door.

While the foregoing is the preferred embodiment of our invention, the cylinder 16 may be provided with the tube 27 only for placing cylinder 16 on the spring pressed side of piston 23 in communication with vacuum to facilitate opening of the door, the door being closed through the expansive action of spring 24 only. In some instances the vacuum connection may be omitted and valve 29 utilized to open and close tube 28 for allowing the door to open and close and for holding the door open under compression respectively.

The valve 29 may be constructed as illustrated in Figure 2 with an atmosphere communicating port 37 of a length such as to communicate with both tubes 27 and 28 in one position of the valve for placing cylinder 16 on both sides of piston 23 in communication with atmosphere when the door is being closed to prevent too rapid closing thereof.

It will be seen from the foregoing disclosure that a door control mechanism is provided embodying in its construction yieldable means for closing a door and maintaining the door closed together with means for cooperation with said yieldable means under control of an operator for opposing the said resilient means, and for assisting said resilient means for closing the door as well as maintaining the door in open position.

The mechanism disclosed is of relatively simple construction whereby it can be manufactured and sold at relatively low cost and due to the simplicity thereof it can be installed in relatively short time without it being necessary to alter the vehicle body construction to any substantial degree.

In Figures 3 to 6 inclusive is illustrated a valve construction well suited for controlling the tubes 27 and 28 for placing same alternately in communication with atmosphere and vacuum, and in Figures 3 and 4 the valve 29' is illustrated in broken connection with a modified form of motor for controlling the door, the valve being shown in a greatly enlarged scale relative to cylinder 16'.

The valve 29' in accordance with this embodiment of my invention while well adapted for substitution for valve 29 in the first form of the invention is particularly adapted for operative connection with a suction motor adapted not only to close the door but to open the door as well.

In this modification, cylinder 16' is pivotally connected at one end thereof to the inside of door D and piston rod 15' pivotally connected to a bracket in the same manner as disclosed in Figure 1.

In accordance with this embodiment of our invention the cylinder 16' through tubes 27' and 28' controlled by valve 29' is put into communication with atmosphere and vacuum on opposite sides of piston 23' alternately as in the first form of the invention, but in this form of the invention piston 23' is of such area and spring 24' of such strength that the pressure on piston 23' caused by atmosphere and vacuum on opposite sides thereof will be sufficient to overcome the expansive effort of spring 24' for opening the door through control valve 29', the door D being in accordance with this embodiment of our invention wholly controlled through manipulation of valve 29'.

The operation of the control mechanism is not dependent upon any specific valve construction, it being only necessary that a valve be provided for putting cylinder 16' on opposite sides of piston 23' into communication with atmosphere and vacuum or suction alternately for opening and closing the door as well as embodying means for maintaining the door in open position.

The valve 29' illustrated in Figures 3 to 6 is well adapted for performing these functions and in its construction comprises a cylindrical casing 41 provided with a closed top 42 and a detachable bottom 43. Threaded into the cylindrical wall of casing 41 are circumferentially spaced nipples 44 and 45 to which the adjacent ends of flexible tubes or conduits 27' and 28' respectively are detachably secured. Rotatably mounted within casing 41 and conforming to the chamber therein is a valve member 47 which is provided in the cylindrical wall thereof with diametrically disposed and circumferentially extending recesses 48 and 49 intercommunicating through a central diametrical port 51 in valve member 47 and valve member 47 is provided with a port 52 centrally thereof at right angles to port 51 and in communication therewith as well as with a nipple 53 detachably secured in bottom 43 of casing 41 to which nipple is detachably secured one end of the tube 31 the opposite end of which is secured to the motor vacuum tank or intake manifold. Valve member 47 is provided in the cylindrical wall thereof with a second pair of diametrically disposed circumferential recesses 55 and 56 which are respectively in communication through ports 57 and 58 with a circumferential recess 59 in the outer face of valve member 47 which recess is always in communication with atmosphere through a port 61 in the top 42.

It will be seen from the construction above described that recesses 48 and 49 are always in communication with the suction or vacuum tube 31' through ports 51 and 52 and nipple 53 and that recesses 55 and 56 are always in communication with the atmosphere through ports 57 and 58 recess 59 and port 61. Valve member 47 has detachably threaded into the outer face thereof and centrally thereof a stud 63 provided with an outer reduced threaded extension 64 which projects through an opening in one end of an operating handle 65 and a nut 66 is threaded on extension 64 for maintaining handle 65 detachably in position, the handle 65 being adapted for manual rotation of valve member 47 within casing 41. Means are provided for maintaining valve member 47 against inadvertent rotation within casing 41 which are preferably of a yielding nature and in the embodiment illustrated may comprise a coil spring 67 seated within a recess 68 in valve member 47 and engaging at one end thereof a ball 69 for forcing same into one of a plurality of spherical seats 71 in casing bottom 43, there being four of such seats as illustrated in Figure 6 as there are four fixed positions of valve member 47 during each complete revolution thereof as will later appear.

The nipples 44 and 45 are so spaced and the recesses 48, 49, 55 and 56 are so arranged in valve member 47, that tubes 27' and 28' communicating with the opposite ends of cylinder 16' are alternately in communication with vacuum and atmosphere for closing and opening the door and in order to maintain the door open it is necessary that tube 28' be closed from communication with any of the recesses in member 47 and accordingly the recesses 48, 49, 55 and 56 are separated by casing contacting portions 73 of a width equal to or slightly exceeding the internal diameter of nipples 44 and 45 such that one of the portions 73 will close the inner end of nipple 45 when door D is in fully open position.

The operation of the door control mechanism in accordance with this form of the invention is as follows:

In the closed position of door D valve member 47 is in the position indicated in Figure 3 when ball 69 is spring pressed into engagement with one of the seats 71 for holding member 47 in this position. In this position of valve member 47, tube 27' is in communication with recess 55 through nipple 44 which recess is in communication with atmosphere through port 57, recess 59 and port 61 and tube 28' is in communication with recess 48 through nipple 45 which recess is in communication with suction or vacuum through ports 51 and 52, nipple 53 and tube 31'. Thus it will be seen that in this position of valve member 47 cylinder 16' will be in communication with atmosphere on the spring pressed side of piston 23' and in communication with suction on the opposite side of piston 23' which will materially assist spring 24' in urging piston 23' inwardly of cylinder 16' for maintaining door D closed with sufficient pressure as to resist opening by manual effort.

When the operator desires to open the door which in this form of the invention is not provided with a latch or catch, he moves valve member 47 through handle 65 within casing 41 in a clockwise direction toward the position indicated in Figure 4 thus putting tubes 27' and 28' in communication with recesses 48 and 56 respectively whereby cylinder 16' is in communication with vacuum on the spring pressed side of piston 23' and with atmosphere on the opposite side of piston 23' whereby the expansive effort of spring 24' is overcome resulting in piston 23' moving in cylinder 16' against spring 24' with a consequent opening of door D.

It will be understood of course that the spring 24' is of such strength and the area of piston 23' is such that the expansive effort of spring 24' will be overcome when valve member 47 is in this position.

The relative lengths of recesses 48 and 56 as well as recesses 49 and 55 or the relative spacing of portions 73 is such that when door D approaches its fully opened position one of the portions 73 seals the inner end of nipple 45 as indicated in Figure 4 thus closing the atmosphere end of cylinder 16' for providing compression for resisting movement of piston 23' tending to close the door and it will be seen upon reference to Figure 4 that in this position of valve member 47 in which nipple 45 is closed, tube 27' is still in communication with vacuum which acts on the spring side of piston 23' for assisting the compression on the opposite side of piston 23' for holding door D in open position.

When door D is in fully open position as indicated in Figure 4 ball 69 is yieldably seated in a second seat 71 for maintaining member 47 in this position.

When it is desired to close the door, the operator moves member 47 again in a clockwise direction putting tube 27' in communication with atmosphere recess 56 and tube 28' into communication with vacuum recess 49 causing spring 24' to be assisted by atmospheric pressure to move piston 23' in cylinder 16 for closing the door.

When the door is fully closed ball 69 will rest in the third seat 71 and valve member 47 will assume a position symmetrical to that indicated in Figure 3 but with the recesses 48, 49, 55 and 56 displaced 180°. Thus it will be seen that door D is opened and closed twice for each complete revolution of valve member 47.

In order to provide for closing tube 28' when door D is fully open the recess spacing portions 73 are so spaced that recesses 48 and 49 are longer than recesses 55 and 56 by an amount equal to the circumferential width of portions 73 and due to this non-uniform spacing of portions 73 member 47 is rotated unequal angular distances in opening and closing the door.

The valve 29' in this form of the invention may be secured to the taxi-meter as represented in Figure 1 or in any other accessible position.

The valve 29' while disclosed in connection with control mechanism for opening as well as closing the door is equally adapted to the first form of the invention as disclosed in Figures 1 and 2 for closing the door and conditioning the door for manual opening.

While it is desirable to employ the spring 24' in the form of the invention according to Figures 3 and 4 for more effectively holding the door closed which in accordance with this form of the invention is not provided with a catch; the spring may be omitted and the door held closed by atmospheric pressure only, and by the omission of the spring the door would be more effectively opened as the expansive effort of the spring would not have to be overcome.

While we have disclosed the control mechanism embodying a suction motor the mechanism may comprise a pressure motor without altering the door operating effect thereof. To employ a pressure motor instead of the suction motor disclosed it would only be necessary to put recesses 48 and 49 in communication with pressure instead of vacuum as by attaching tube 31' to the oil pump or other pressure source, in this case of course the connections 27' and 28' to cylinder 16' would have to be reversed.

It will be seen from the foregoing disclosure that a door control mechanism is provided which is of comparatively simple construction, cheap of manufacture, easy to install, and is adapted to control a door in the manner above set forth.

While we have disclosed only specific embodiments of our invention, it is to be understood that such are merely illustrative and not restrictive since the scope of our invention is defined in the subjoined claims.

What we claim is:—

1. Door control mechanism for motor vehicles comprising a cooperating piston and cylinder adapted for individual pivotal connection with the body and a door of a vehicle; yieldable means in said cylinder engaging said piston for normally urging said door to closed position, valve controlled ports communicating with said cylinder on opposite sides of said piston and valve control mechanism for putting said cylinder in communication with atomsphere and suction alternately on opposite sides of said piston to selectively assist said yieldable means in maintaining said door closed or to oppose said yieldable means to permitting said door to be readily opened respectively.

2. Door control mechanism for motor vehicles comprising a cylinder adapted for pivotal connection at one end thereof to a vehicle door; a piston in said cylinder provided with a rod projecting through one end of said cylinder and pivotally connected to the body of the vehicle; an expansion spring in said cylinder with the opposite ends thereof in bearing engagement with one end of said cylinder and said piston; said spring acting through said cylinder and piston to urge said door to closed position; and valve controlled conduits communicating with opposite ends of said cylinder for subjecting said piston alternately on opposite sides thereof to pressure and suction for assisting and opposing said spring respectively for holding said door closed and effecting opening thereof.

3. Door control mechanism for motor vehicles comprising a cylinder adapted for pivotal connection at one end thereof to the inside of a vehicle door; a piston movably disposed in said cylinder and having a rod projecting through one end of said cylinder and adapted for pivotal connection with the inside of the body of said vehicle; a conduit communicating with each end of said cylinder on opposite sides of said piston; a valve member comprising a casing with which said conduits communicate; a rotatable member in said casing provided with recesses respectively in communication with atmosphere and a suction source of the motor of said vehicle; and means for manually rotating said rotatable member for alternately placing opposite ends of said cylinder in communication with atmosphere and vacuum for effecting pressure alternately on opposite sides of said piston for closing said door and effecting opening thereof respectively.

4. The combination defined in claim 3 in which said rod is pivoted to a bracket secured to said body and projecting partially over said door and in which said door is provided with a stop for engagement by the free end of said cylinder in both the open and closed positions of said door.

5. The combination defined in claim 3 in which said rotatable member is provided with a pair of diametrically disposed recesses constantly in communication with a suction source and a second pair of diametrically disposed recesses constantly in communication with atmosphere; said recesses arranged circumferentially in the outer circular wall of said member in spaced relation defining casing engaging portions, one of which is adapted to close communication between one end of said cylinder and atmosphere each time said door is completely opened.

6. In combination with a body having a swinging door, a door control apparatus including complemental elements connected to said door and said body, said elements comprising a casing and a piston disposed within said casing to divide the latter into a pair of fluid chambers, a spring normally urging said door toward its closed position, means for admitting and exhausting air or other fluid to and from either of said chambers to open said door against the resistance of said spring or to supplement the action of said spring, and valve mechanism for controlling said last mentioned means, said mechanism including shiftable means for completely closing one of said fluid chambers when the door is open and for thereby holding said door open against the action of said spring until such time as it may be desired to again close the door.

LESLIE L. STEINDLER.
CHARLES B. WATERS.